(12) United States Patent
Zimmel et al.

(10) Patent No.: US 8,500,341 B2
(45) Date of Patent: Aug. 6, 2013

(54) FIBER OPTIC CABLE ASSEMBLY

(75) Inventors: Steven C. Zimmel, Minneapolis, MN (US); Christopher Stroth, Lakeville, MN (US); Wayne M. Kachmar, North Bennington, VT (US); Ronald J. Kleckowski, Manchester Center, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 440 days.

(21) Appl. No.: 12/950,665

(22) Filed: Nov. 19, 2010

(65) Prior Publication Data

US 2011/0150398 A1 Jun. 23, 2011

Related U.S. Application Data

(60) Provisional application No. 61/263,166, filed on Nov. 20, 2009.

(51) Int. Cl.
*G02B 6/36* (2006.01)

(52) U.S. Cl.
USPC .................. 385/81; 385/54; 385/60; 385/62; 385/78; 385/113; 385/114

(58) Field of Classification Search
USPC ..................................................... 385/62, 81
See application file for complete search history.

(56) References Cited

U.S. PATENT DOCUMENTS

| | | | |
|---|---|---|---|
| 5,863,083 A | 1/1999 | Giebel et al. | |
| 6,542,674 B1 | 4/2003 | Gimblet | |
| 6,648,520 B2 | 11/2003 | McDonald et al. | |
| 6,899,467 B2 | 5/2005 | McDonald et al. | |
| 6,962,445 B2 | 11/2005 | Zimmel et al. | |
| 6,993,237 B2 | 1/2006 | Cooke et al. | |
| 7,090,406 B2 | 8/2006 | Melton et al. | |
| 7,090,407 B2 | 8/2006 | Melton et al. | |
| 7,111,990 B2 | 9/2006 | Melton et al. | |

(Continued)

OTHER PUBLICATIONS

International Search Report and Written Opinion mailed Jul. 12, 2011.

*Primary Examiner* — Hemang Sanghavi
(74) *Attorney, Agent, or Firm* — Merchant & Gould P.C.

(57) ABSTRACT

The present disclosure relates to a drop cable assembly including a fiber optic drop cable having a length that extends from a first end of the fiber optic drop cable to an opposite second end of the fiber optic drop cable. The fiber optic drop cable also includes an intermediate location located between the first and second ends of the fiber optic drop cable. The drop cable assembly also includes a first fiber optic connector mounted at the first end of the fiber optic drop cable and a second fiber optic connector mounted at the second end of the fiber optic drop cable. The drop cable assembly further includes an optical fiber that extends continuously without splicing along the length of the fiber optic drop cable from the first fiber optic connector to the second fiber optic connector. The fiber optic drop cable has a first cable segment that extends from the first end of the fiber optic drop cable to the intermediate location and a second cable segment that extends from the intermediate location to the second end of the fiber optic drop cable. The first cable segment is more robust than the second cable segment and the second cable segment being more flexible than the first cable segment. The present disclosure also relates t methods and arrangements for mechanically attaching fiber optic connectors to drop cables of the type described above.

15 Claims, 6 Drawing Sheets

U.S. PATENT DOCUMENTS

| | | |
|---|---|---|
| 7,113,679 B2 | 9/2006 | Melton et al. |
| 7,264,402 B2 | 9/2007 | Theuerkorn et al. |
| 7,463,803 B2 | 12/2008 | Cody et al. |
| 7,537,393 B2 * | 5/2009 | Anderson et al. ............... 385/54 |
| 7,568,844 B2 | 8/2009 | Luther et al. |
| 7,572,065 B2 | 8/2009 | Lu et al. |
| 8,126,307 B2 | 2/2012 | Hovland et al. |
| 8,202,008 B2 | 6/2012 | Lu et al. |
| 2005/0002622 A1 | 1/2005 | Sutehall et al. |
| 2006/0045429 A1 | 3/2006 | Chen et al. |
| 2007/0212009 A1 | 9/2007 | Lu et al. |
| 2009/0148103 A1 | 6/2009 | Lu et al. |
| 2009/0232460 A1 * | 9/2009 | Abernathy et al. ........... 385/102 |
| 2009/0238534 A1 | 9/2009 | Ahmed |
| 2010/0322584 A1 | 12/2010 | Kowalczyk et al. |
| 2011/0135268 A1 | 6/2011 | Rudenick et al. |
| 2011/0188809 A1 | 8/2011 | LeBlanc et al. |

* cited by examiner

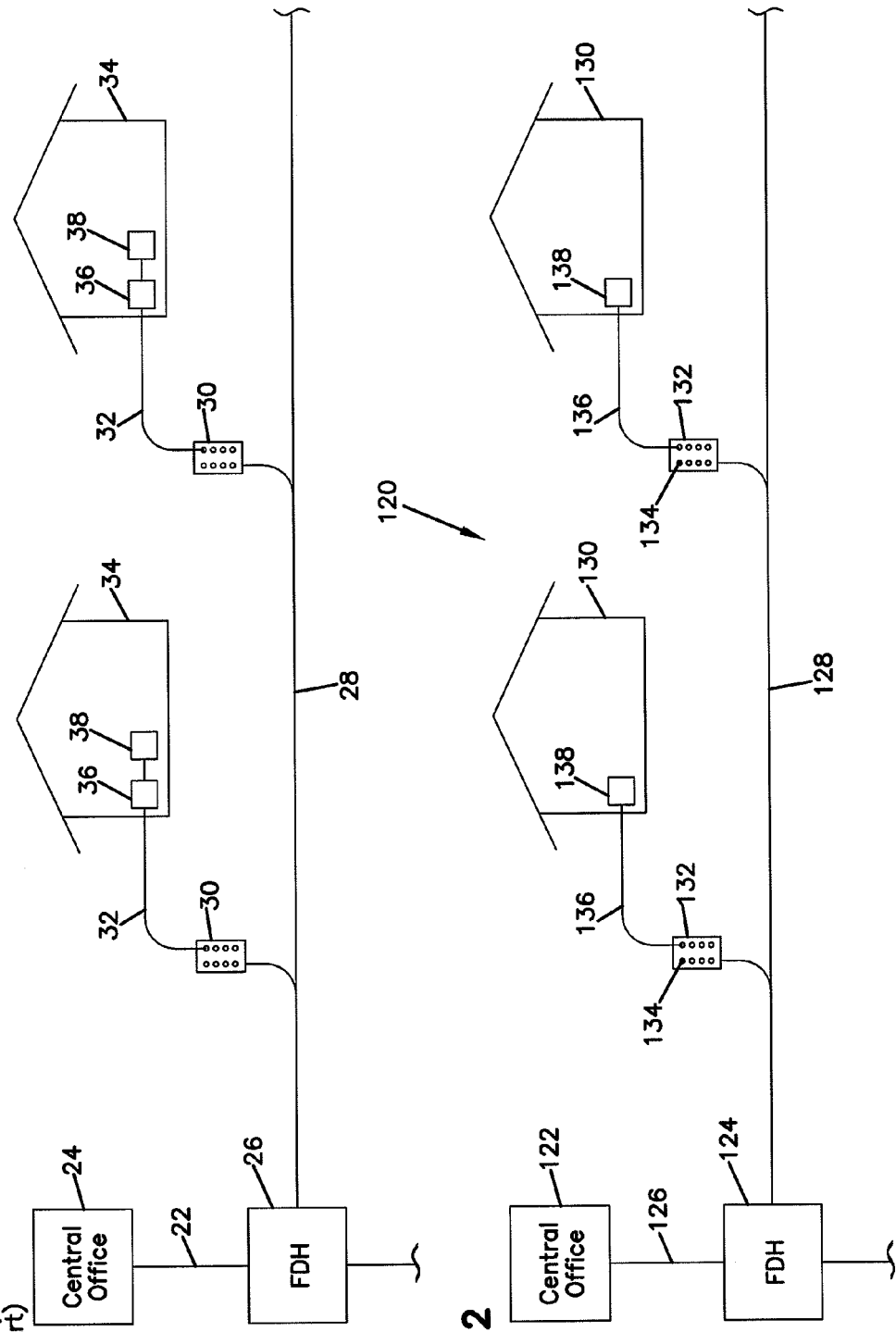

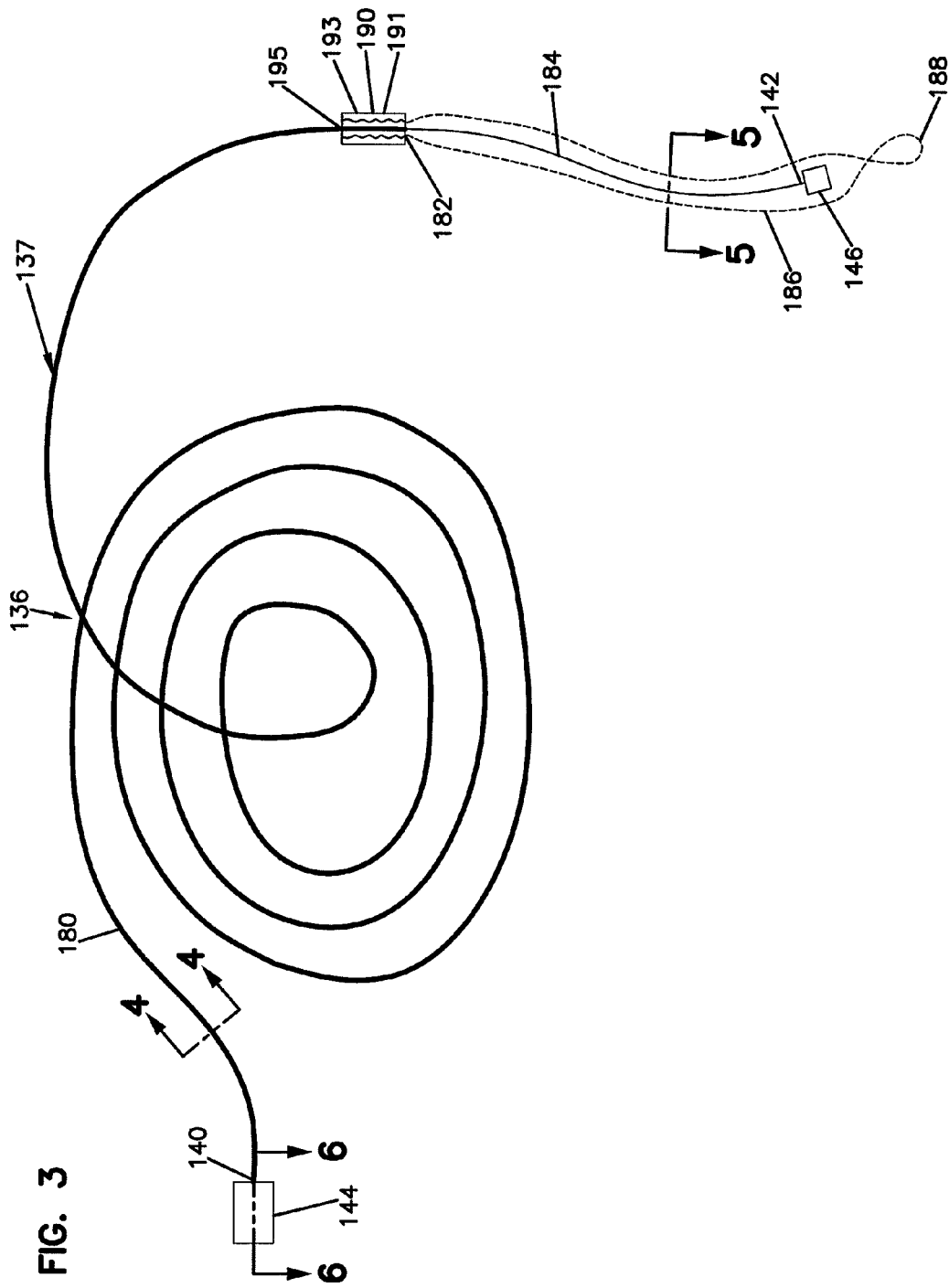

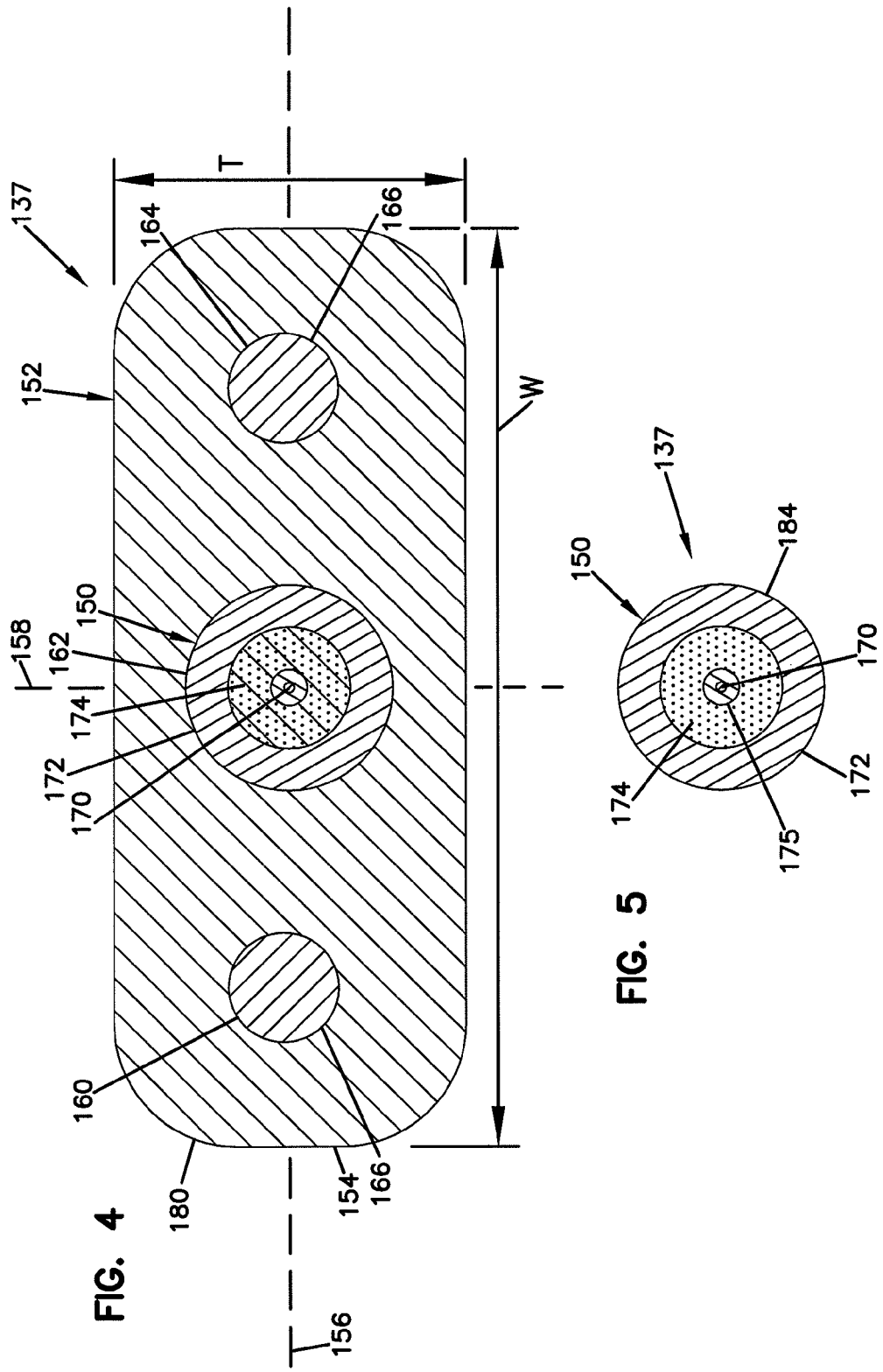

FIBER OPTIC CABLE ASSEMBLY

CROSS-REFERENCE TO RELATED APPLICATION

This application claims the benefit of U.S. Provisional Patent Application Ser. No. 61/263,166, filed Nov. 20, 2009, which application is hereby incorporated by reference in its entirety.

TECHNICAL FIELD

The present disclosure relates generally to fiber optic cable assemblies for use in fiber optic networks.

BACKGROUND

Fiber optic telecommunications technology is becoming more prevalent as service providers strive to deliver higher band width communication capabilities to customers/subscribers. The phrase "fiber-to-the-x" (FTTX) generally refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office (e.g., a remote data center) to a cabinet serving a neighborhood. Subscribers connect to the cabinet using traditional copper cable technology such as a coaxial cable or twisted pair wiring. The difference between an FTTN and an FTTC network relates to the area served by the cabinet. Typically, FTTC networks have cabinets closer to the subscribers and serve a smaller subscriber area than the cabinets of FTTN networks. In an FTTP network, fiber optic cables are run from a service provider's data center (e.g., a central office) all the way to the subscriber's premises. Example FTTP networks include fiber-to-the-home (FTTH) networks and fiber-to-the-building (FTTB) networks. In an FTTB network, optical fibers are routed from the data center over an optical distribution network to an optical network terminal (ONT) located at a building. The ONT typically includes active components that convert the optical signals into electrical signals in one direction and convert electrical signals into optical signals in the opposite direction. The electrical signals are typically routed from the ONT to the subscriber's residence or office space using traditional copper technology. In an FTTH network, fiber optic cable is run from the service provider's data center to an ONT located at the subscriber's residence or office space. Once again, at the ONT, optical signals are typically converted into electrical signals for use with the subscriber's devices.

FIG. 1 shows an example FTTP network in which an F1 distribution cable 22 routes optical signals between a central office 24 and a fiber distribution hub 26. An F2 distribution cable 28 is used to route optical signals between the fiber distribution hub 26 and a plurality of drop terminals 30. Drop cables 32 are used to optically connect the drop terminals 30 to subscriber locations 34. At the subscriber locations 34, the drop cables 32 are routed to splice boxes 36 where connectorized pigtails are spliced to the ends of the drop cables 32. The connectorized pigtails are routed from the splice boxes to ONTs 38.

The drop cables 32 typically have robust constructions suitable for use in outside environments. First ends of the drop cables 32 can be terminated with ruggedized fiber optic connectors that interconnect with the drop terminals. As described above, seconds ends of the drop cables are spliced to pigtails at the splice boxes.

SUMMARY

Features of the present disclosure relate to methods, systems and devices for facilitating providing fiber-to-the-premises. In certain embodiments, a drop cable having a cable unit surrounded by a reinforced outer jacket arrangement is utilized. In certain embodiments, a ruggedized connector is crimped to a strength layer of the cable unit and is also adhesively secured to at least one strength member of the outer jacket arrangement.

Another aspect of the present disclosure relates to a cable assembly including a fiber optic cable having an optical fiber, a first jacket surrounding the optical fiber and a strength layer positioned between the optical fiber and the first jacket. The cable assembly also includes an outer jacket arrangement enclosing at least a portion of the fiber optic cable. The outer jacket arrangement includes a second jacket that is more robust than the first jacket. The second jacket defines a first passage in which a first strength member is positioned and a second passage in which the fiber optic cable is positioned. The cable assembly also includes a fiber optic connector located at an end of the cable assembly. The fiber optic connector includes a plug body having a distal end and an opposite proximal end, a ferrule supporting an end portion of the optical fiber of the fiber optic cable that is positioned at the distal end of the plug body and a spring positioned within the plug body for biasing the ferrule in a distal direction. The fiber optic connector also includes a spring stop secured to the proximal end of the plug body. The spring stop includes a strength layer anchoring portion that extends proximally outwardly from the proximal end of the plug body. The fiber optic connector further includes a crimp sleeve that secures an end portion of the strength layer to the strength layer anchoring portion of the spring stop. The crimp sleeve includes a distal portion that extends over the strength layer anchoring portion of the spring stop and a proximal portion that extends over an end portion of the first jacket. The fiber optic connector further includes a strength member retention housing positioned adjacent the proximal end of the plug body. The strength member retention housing surrounds the crimp sleeve and includes a first retention portion in which the first strength is adhesively affixed.

A further aspect of the present disclosure relates to a drop cable assembly including a fiber optic drop cable having a length that extends from a first end of the fiber optic drop cable to an opposite second end of the fiber optic drop cable. The drop cable assembly also includes a first fiber optic connector mounted at the first end of the fiber optic drop cable and a second fiber optic connector mounted at the second end of the fiber optic drop cable. The fiber optic drop cable includes a first portion that extends from the first end of the fiber optic drop cable to an intermediate location along the length of the drop cable, and a second portion that extends from the intermediate location to the second end of the fiber optic drop cable. The first portion of the fiber optic drop cable includes: an optical fiber; a first jacket surrounding the optical fiber; a strength layer positioned between the first jacket and the optical fiber; a second jacket surrounding the first jacket; and a first strength member positioned outside the first jacket and within the second jacket. The second jacket has an elongate transverse cross-sectional profile and the first strength member can accommodate a tensile load of at least 150 pounds. The second portion of fiber optic drop cable includes the optical fiber, the first jacket and the strength layer, but does not include the first strength member or the second jacket. The drop cable assembly further includes a pulling sock mounted over the second portion of the fiber optic drop cable. The pulling sock includes a first end including a pulling eye and a second end attached to the second jacket of the fiber optic drop cable.

Another aspect of the present disclosure relates to a drop cable assembly including a fiber optic drop cable having a length that extends from a first end of the fiber optic drop cable to an opposite second end of the fiber optic drop cable. The fiber optic drop cable includes an intermediate location located between the first and second ends of the fiber optic drop cable. The drop cable assembly also includes a first fiber optic connector mounted at the first end of the fiber optic drop cable and a second fiber optic connector mounted at the second end of the fiber optic drop cable. The drop cable assembly further includes an optical fiber that extends continuously without splicing along the length of the fiber optic drop cable from the first fiber optic connector to the second fiber optic connector; a first jacket surrounding the optical fiber, the first jacket extending along the length of the fiber optic drop cable from the first fiber optic connector to the second fiber optic connector; and a strength layer positioned between the first jacket and the optical fiber. The strength layer extends along the length of the fiber optic drop cable from the first fiber optic connector to the second fiber optic connector. The drop cable assembly additionally includes: a second jacket surrounding the first jacket, the second jacket extending along the length of the fiber optic drop cable from the first fiber optic connector to the intermediate location, the second jacket terminating at the intermediate location; and a first strength member positioned outside the first jacket and within the second jacket, the first strength member extending along the length of the fiber optic drop cable from the first fiber optic connector to the intermediate location, the first strength member terminating at the intermediate location. The second jacket has an elongate transverse cross-sectional profile and the first strength member can accommodate a tensile load of at least 150 pounds. A pulling sock is mounted over the second end of the fiber optic drop cable. The pulling sock extends along the length of the fiber optic drop cable from the second end of the fiber optic drop cable to the intermediate location of the fiber optic drop cable. The pulling sock includes a first end including a pulling eye and a second end attached to the second jacket of the fiber optic drop cable.

These and other features and advantages will be apparent from reading the following detailed description and reviewing the associated drawings. It is to be understood that both the foregoing general description and the following detailed description are explanatory only and are not restrictive of the broad aspects of the disclosure.

BRIEF DESCRIPTION OF THE DRAWINGS

FIG. 1 is a schematic diagram showing an example prior art FTTP network;

FIG. 2 is a schematic diagram of an FTTP network in accordance with the principles of the present disclosure;

FIG. 3 is a schematic representation of a fiber optic drop cable suitable for use in the FTTP network of FIG. 2;

FIG. 4 is a cross-sectional view taken along section line 4-4 of FIG. 3;

FIG. 5 is a cross-sectional view taken along section line 5-5 of FIG. 3;

DETAILED DESCRIPTION

Figure 6:
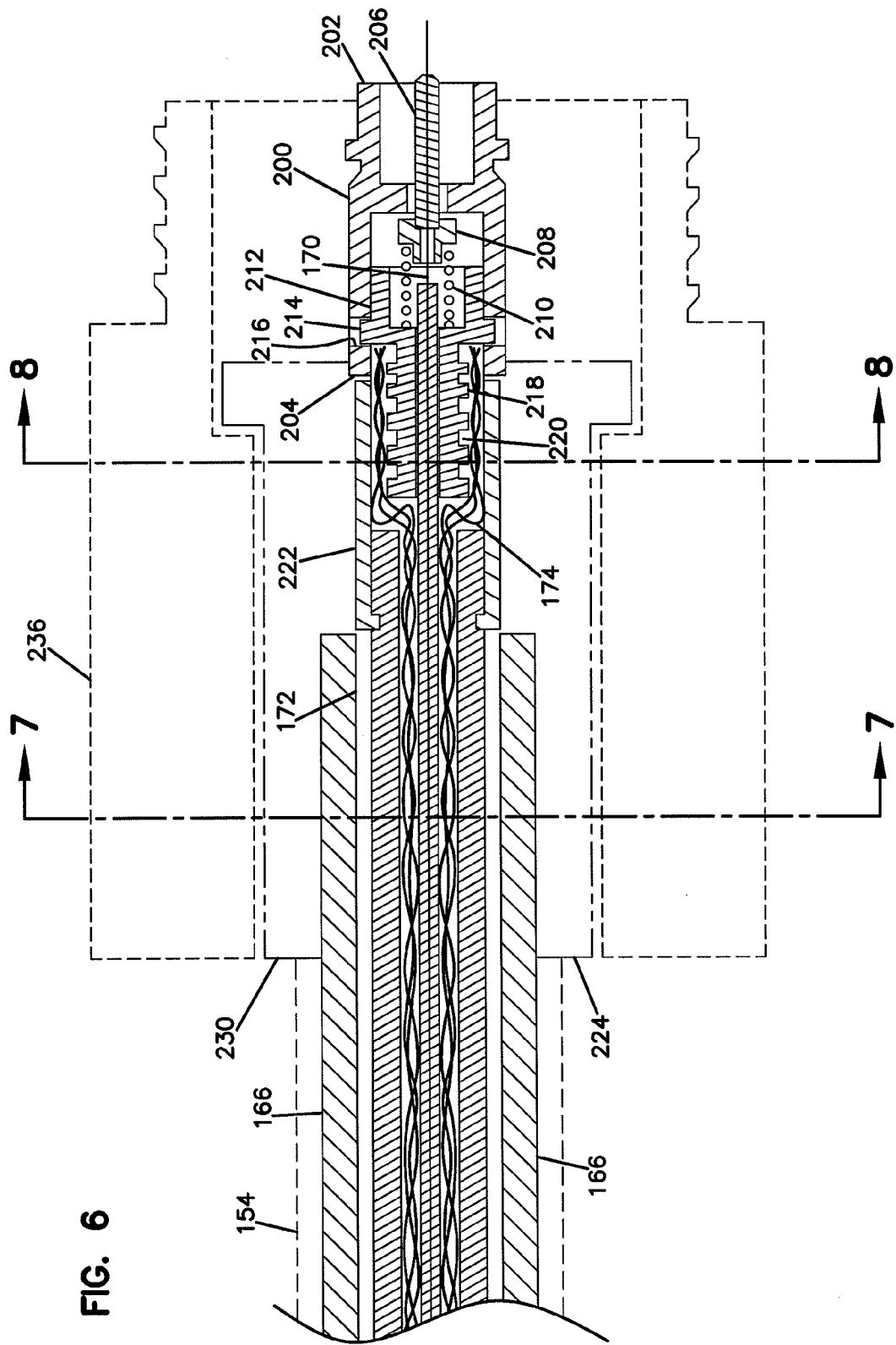
FIG. 6 is a lengthwise cross-sectional view taken along section line 6-6 of FIG. 3.

FIG. 2 shows an FTTP network 120 in accordance with the principles of the present disclosure. The FTTP network 120 includes a central office 122 optically connected to a fiber distribution hub 124 by an F1 fiber distribution cable 126. The FTTP network 120 also includes an F2 fiber optic distribution cable 128 that extends outwardly from the fiber distribution hub 124 along a route that passes by a plurality of subscriber locations 130. The F2 fiber optic distribution cable 128 is optically connected to a plurality of drop terminals 132 having outside accessible, ruggedized fiber optic adapters 134. Fiber optic drop cable assemblies 136 are routed from the drop terminals 132 to ONTs 138 located within the subscriber locations 130. The fiber optic drop cable assemblies 136 are configured to allow for direct optical connections with the ONTs 138 without requiring any intermediate splicing or splice boxes.

FIG. 3 shows an example configuration for one of the fiber optic drop cable assemblies 136. The drop cable assembly 136 of FIG. 3 is shown prior to installation. The drop cable assembly 136 includes a drop cable 137 having first end 140 and an opposite second end 142. A first fiber optic connector 144 (e.g., a ruggedized fiber optic connector) is mounted at the first end 140 of the drop cable 137. The first fiber optic connector 144 is configured to be received within one of the fiber optic adapters 134 of one of the drop terminals 132 to provide an optical connection between the drop cable 137 and the F2 distribution cable 128. A second fiber optic connector 146 (e.g., a standard SC connector) is positioned at the second end 142 of the drop cable 137. The second fiber optic connector 146 is adapted to be received within a corresponding fiber optic adapter provided at the ONT 138 so as to provide an optical connection between the drop cable 137 and the ONT 138.

In a preferred embodiment, the connectors 144, 146 are mounted to the drop cable 137 at the factory (i.e. the connectors are factory installed) so that no splicings or field terminations are required to be made by a technician in the field. In certain embodiments, the first fiber optic connector 144 has a construction that is more robust than the second fiber optic connector 146. By "more robust", it is meant that the first fiber optic connector 144 is stronger and able to accommodate higher tensile cable pull-out loads than the second fiber optic connector 146.

Referring still to FIG. 3, the drop cable 137 includes a first portion 180 (i.e., a first cable segment) that extends from the first end 140 of the drop cable 137 to an intermediate location 182 of the drop cable 137. The drop cable 137 also includes a second portion 184 (i.e., a second cable segment) that extends from the intermediate location 182 of the drop cable 137 to the second end 142 of the drop cable 137. The first portion 180 of the drop cable 137 is more robust than the second portion 184 of the drop cable 137. By "more robust" it is meant that the first portion 180 of the drop cable 137 can handle higher tensile loads than the second portion 184 of the drop cable 137. The second portion 184 of the drop cable is preferably more flexible than the first portion 180 of the drop cable 137. The robust construction of the first portion 180 of the drop cable 137 makes it particularly suitable for outside environmental use, while the ease of handling and routing provided by the flexibility of the second portion 184 makes it suitable for indoor applications.

As shown at FIG. 3, a pulling sock 186 having a pulling loop 188 is mounted over the second portion 184 of the drop cable 137. A securing member 190 (e.g., shrink wrap) is used to secure one end of the pulling sock 186 to the first cable portion 180 at a location adjacent the intermediate location 182. The pulling sock 186 allows the drop cable 137 to be pulled through conduit (e.g., underground conduit or conduit within a building or subscriber location) during installation of the drop cable 137. After the second end 142 of the drop cable 137 has been pulled to a desired location (e.g., a location adjacent an ONT within a subscriber location), the securing member 190 can be stripped away and the pulling sock 186 can be removed from the drop cable 137 thereby exposing the second portion 184 of the drop cable 137.

In one embodiment, the securing member 190 can include a shrinkable sleeve (e.g., a heat shrink sleeve) having a first portion 191 that overlaps an end portion of the pulling sock such that the end portion of the pulling sock 186 is compressed between the outer jacket 154 and sleeve. The sleeve also includes a second potion 193 that extends beyond the end portion of the pulling sock and directly overlaps/contacts the outer jacket 154 without the pulling sock being posited therein between. In certain embodiments, the inner surface of the sleeve can have a better gripping characteristic (e.g., increased stickiness or tackiness) as compared to an outer surface of the sleeve. A rip cord 195 can be provided that extends the length of the sleeve for use in tearing the sleeve along its length when it is desired to remove the pulling sock form the drop cable 137. The rip cord positioned inside sleeve and outside the outer jacket 154 and the pulling sock 186.

As described above, the construction of the first portion 180 of the drop cable 137 allows the first portion 180 to withstand outside environments. The configuration of the second portion 184 of the drop cable 137 is highly flexible and is ideally suited for handling within interior environments such as a building or subscriber location. During installation, if an additional length of the second portion 184 of the drop cable 137 is needed within a building, exterior reinforcing features of the first portion 180 can be stripped away thereby increasing the length of the second portion 184. Since the connector 146 is factory installed to the second end 142 of the drop cable 137, the second end 142 of the drop cable 137 can be readily connected to a structure such as an ONT without requiring an intermediate splice or field termination.

Referring to FIGS. 4 and 5, the drop cable 137 includes a cable unit 150 that runs the entire length of the drop cable 137 from the first end 140 to the second end 142 of the drop cable 137. The cable unit 150 preferably runs continuously from the first fiber optic connector 144 to the second fiber optic connector 146 without any intermediate breaks or splices. Thus, the cable unit 150 extends continuously through the length of the first portion 180, the intermediate location 182 and the length of the second portion 184 of the drop cable 137. The cable unit 150 is a stand-alone fiber optic cable that is highly flexible and ideally suited for indoor use. The cable unit 150 alone forms the second portion 184 of the drop cable 137. The cable unit 150 in combination with a robust outer jacket arrangement 152 forms the first portion of the drop cable 137. The second portion 184 of the drop cable 137 includes only the cable unit 150 (i.e., the robust outer jacket arrangement 152 extends only from the first end 140 to the intermediate location 182 of the drop cable 137). Because the outer jacket arrangement 152 is not provided along the second portion 184 of the drop cable 137, the second portion 184 of the drop cable 137 is highly flexible and is adapted for easy handling and routing within an enclosure or elsewhere at a building or the subscriber location.

The cable unit 150 of the fiber optic drop cable 137 includes a single fiber 170 positioned inside a jacket 172. In other embodiments, multiple fibers can be provided. In the depicted embodiment, the fiber 170 is buffered (e.g., a tight buffer layer 175 is provided). A strength layer 174 (i.e., a reinforcing layer) is positioned between the fiber 170 and the jacket 172. In one embodiment, the strength layer 174 is a tensile reinforcing layer configured to provide the cable unit 150 with tensile reinforcement while not providing the cable unit 150 with meaningful reinforcement against compression. In one example embodiment, the strength layer 174 includes a layer of aramid yarn.

In one embodiment, the fiber 170 includes a glass core surrounded by a cladding layer and one or more coating layers. In certain embodiments, the core combined with the cladding and coating layers has an outer diameter of about 240-260 microns. In certain embodiments, the coating layers can include a material such as an acrylate polymer. As mentioned above, in certain embodiments, the tight buffered layer 175 can be provided around the coating layers. In certain embodiments, the tight buffered layer 175 can have an outer diameter of about 900 microns.

The jacket 172 of the cable unit 150 has a circular transverse cross-sectional profile and is preferably made of a polymeric material. In one embodiment, the jacket has an outer diameter less than 4 mm. In still another embodiment, the outer jacket 172 has an outer diameter equal to or less than 3.5 mm or less than or equal to 3 mm.

FIG. 4 is a transverse cross-sectional view of the cable 137 of FIG. 3 taken through the first portion 180 of the drop cable 137. As shown at FIG. 4, the first portion 180 of the drop cable 137 includes the cable unit 150 positioned within the outer jacket arrangement 152. The outer jacket arrangement 152 includes an outer jacket 154 having a tough, abrasion resistant construction. The outer jacket 154 has a transverse cross-sectional profile that is elongated along a major axis 156 as compared along a minor axis 158. For example, the outer jacket 154 has a width W along the major axis 156 that is larger than a thickness T along the minor axis 158. In one embodiment, the width W is at least 50% larger than the thickness T.

The outer jacket 154 defines a first passage 160, a second passage 162 and a third passage 164 that are generally parallel to one another. The passages 160, 162 and 164 extend along a central axis of the cable 137 and extend throughout the length of the outer jacket 154. Strength members 166 are positioned within the first and third channels 160, 164. The strength members 166 are configured to reinforce the outer jacket 154 with respect to both tensile and compressive loading. In one embodiment, the strength members 166 are formed by rods made of glass fiber reinforced epoxy. The first, second and third passages 160, 162 and 164 are aligned along the major axis 156 of the cable 137. The second passage 162 is positioned between the first and third passages 160, 164.

The strength members 166 are adapted to provide the first portion 180 of the drop cable 137 with a robust construction capable of withstanding high tensile loads. In one embodiment, the strength members 166 can carry a 150 pound tensile load applied in an orientation extending along central longitudinal axes of the strength members without undergoing meaningful deterioration of the tensile properties of the strength members. In another embodiment, the strength members 166 can carry a 200 pound tensile load applied in an orientation extending along the central longitudinal axes of the strength member without undergoing meaningful deterioration in its tensile properties. In still another embodiment, the strength members 166 can carry a 300 pound tensile load applied in an orientation that extends along the central longitudinal axes of the strength members without experiencing meaningful deterioration of its tensile properties.

It will be appreciated that the outer jacket 154 can be shaped through an extrusion process and can be made by any number of different types of polymeric materials. In certain embodiments, the outer jacket 154 can have a construction the resists post-extrusion shrinkage of the outer jacket 154. For example, the outer jacket 154 can include a shrinkage reduction material disposed within a polymeric base material (e.g., polyethylene). U.S. Pat. No. 7,379,642, which is hereby incorporated by reference in its entirety, describes an exemplary use of shrinkage reduction material within the base material of a fiber optic cable jacket.

In one embodiment, the shrinkage reduction material is a liquid crystal polymer (LCP). Examples of liquid crystal polymers suitable for use in fiber-optic cables are described in U.S. Pat. Nos. 3,911,041; 4,067,852; 4,083,829; 4,130,545; 4,161,470; 4,318,842; and 4,468,364 which are hereby incorporated by reference in their entireties. To promote flexibility of the cable, the concentration of shrinkage material (e.g. LCP) is relatively small as compared to the base material. In one embodiment, and by way of example only, the shrinkage reduction material constitutes less than about 10% of the total weight of the outer jacket 154. In another embodiment, and by way of example only, the shrinkage reduction material constitutes less than about 5% of the total weight of the outer jacket 154. In another embodiment, the shrinkage reduction material constitutes less than about 2% of the total weight of the outer jacket 154. In another embodiment, shrinkage reduction material constitutes less than about 1.9%, less than about 1.8%, less than about 1.7%, less than about 1.6%, less than about 1.5%, less than about 1.4%, less than about 1.3%, less than about 1.2%, less than about 1.1%, or less than about 1.0% of the total weight of the outer jacket 154.

Example base materials for the outer jacket 154 include low-smoke zero halogen materials such as low-smoke zero halogen polyolefin and polycarbon. In other embodiments, the base material can include thermal plastic materials such as polyethylene, polypropylene, ethylene-propylene, copolymers, polystyrene and styrene copolymers, polyvinyl chloride, polyamide (nylon), polyesters such as polyethylene terephthalate, polyetheretherketone, polyphenylene sulfide, polyetherimide, polybutylene terephthalate, as well as other plastic materials. In still other embodiments, the outer jacket 154 can be made of low density, medium density or high density polyethylene materials. Such polyethylene materials can include low density, medium density or high density ultra-high molecular weight polyethylene materials.

In certain embodiments, the outer jacket 154 can have a rodent resistant construction. For example, the jacket 154 can have a Shore D hardness of at least 85. One example material suitable for providing a rodent resistant construction includes a material blend including LCP, as described above, which is incorporated into a base material including polyamide 12.

It will be appreciated that the jacket 172 of the cable unit 150 can be constructed of the same material types described above with respect to the outer jacket 154. However, in certain embodiments, the material blends and durometers are selected such that the outer jacket 154 is tougher and more abrasion resistant than the jacket 172. In certain embodiments, the jacket 172 includes a blend of LCP and a polymeric base material. The types of base material and the concentration of LCP in the base material for the jacket 172 can be the same as described above with respect to the jacket 154.

FIG. 6 is a longitudinal cross-sectional view of the ruggedized fiber optic connector 144 provided at the first end 140 of the fiber optic drop cable 137. As shown at FIG. 6, the ruggedized fiber optic connector 144 includes a plug body 200 having a distal end 202 and an opposite proximal end 204. A ferrule 206 is mounted at the distal end 202 of the plug body 200. The ferrule 206 supports an end portion of the optical fiber 170 of the cable unit 150. A polished end face of the optical fiber 170 is located at a distal end of the ferrule 206 and a hub 208 is mounted at a proximal end of the ferrule 206. The ferrule 206 is biased in a distal direction by a spring 210 mounted within the plug body 200. Specifically, the spring 210 is captured between the hub 208 and a spring stop 212. The spring stop 212 is mechanically secured to the proximal end 204 of the plug body 200. For example, the spring stop 212 includes tabs 214 that fit within corresponding receptacles 216 defined by the plug body 200 to prevent the spring stop 212 from moving axially relative to the plug body 200. The spring stop 212 includes a proximal portion 218 that projects proximally outwardly from the proximal end 204 of the plug body 200.

The proximal portion 218 of the spring stop 212 is adapted to function as a strength member anchor. An outer surface 220 of the proximal portion 218 is configured for supporting a crimp. For example, the outer surface 220 can include knurling, projections, ridges or other structures for facilitating supporting a crimp. As shown at FIG. 6, the strength layer 174 of the cable unit 150 is mechanically secured to the proximal portion 218 of the spring stop 212 by a crimp sleeve 222. An end portion of the strength layer 174 is compressed between the crimp sleeve 222 and the outer surface 220 of the proximal portion 218 of the spring stop 212. A distal portion of the crimp sleeve 222 is positioned over the proximal portion 218 of the spring stop 212 while a proximal portion of the crimp sleeve 222 fits over an end portion of the jacket 172 of the inner fiber optic cable 150.

Figure 7:
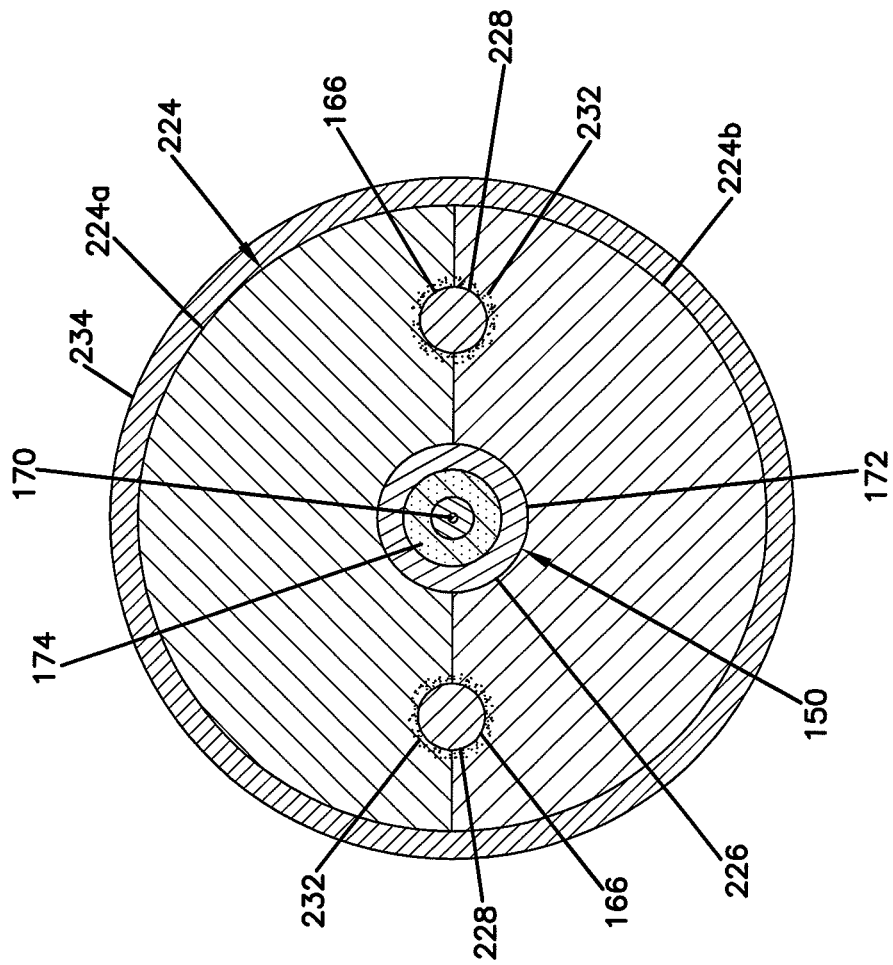
FIG. 7 is a cross-sectional view taken along section line 7-7 of FIG. 6.
Figure 8:
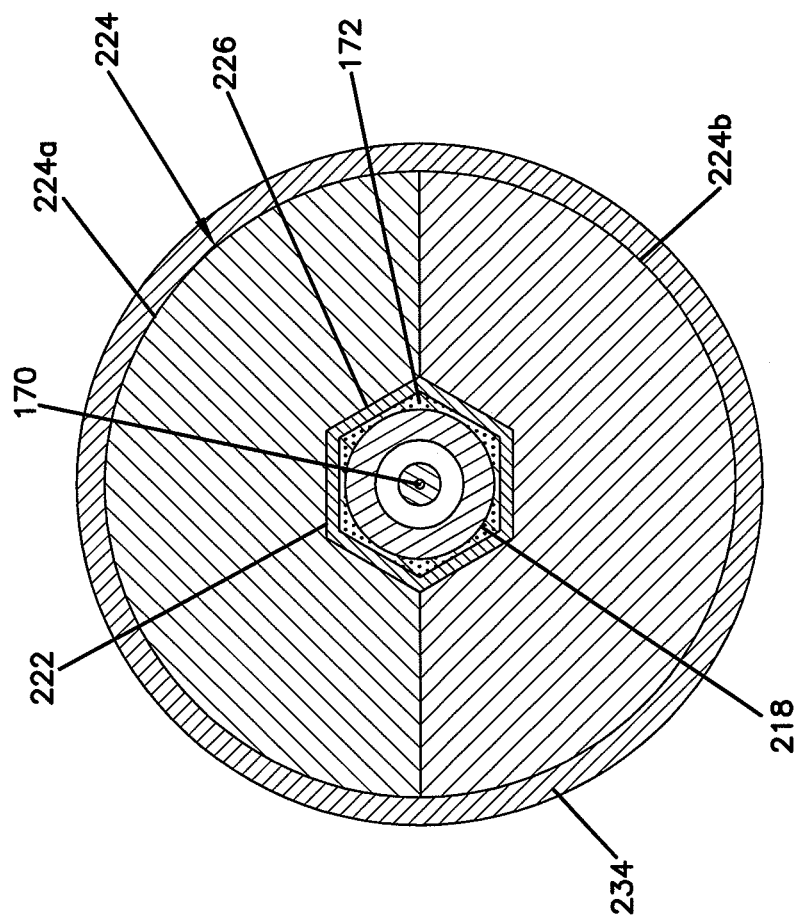
FIG. 8 is a cross-sectional view taken along section line 8-8 of FIG. 6.

The ruggedized fiber optic connector 144 also includes an anchor structure or housing 224 for anchoring the strength members 166 of the outer jacket arrangement 152. As shown at FIGS. 6 and 7, the housing 224 includes first and second housing pieces 224a, 224b that cooperate to define a center passage 226 and two strength member passages 228. The passages 226, 228 are parallel to one another and are aligned generally parallel to a central longitudinal axis of the plug body 200. The central passage 226 is configured for receiving an end portion of the cable unit 150 while the strength member passages 228 are configured for receiving the strength members 166 of the outer jacket arrangement 152. Specifically, the strength member passages 228 receive end portions of the strength members 166 that project distally beyond an end portion 230 of the outer jacket 154. An adhesive material 232 such as epoxy is preferably provided between the housing pieces 224a, 224b and within the strength member passages 228 to assist in anchoring the strength members 166 within the housing 224. The adhesive material 232 also functions to secure the housing pieces 224a, 224b together. Additionally, a reinforcing sleeve 234 can be positioned around the exterior of the housing 224 to assist in holding the housing pieces 224a, 224b together. In certain embodiments, the mechanical connection between the strength members 166 and the housing 224 can withstand a pull-out load of at least 100 pounds.

The crimp sleeve 222 of the ruggedized connector 144 provides multiple functions. First, the crimp sleeve 222 anchors the strength layer 174 of the cable unit 150 to the spring stop 212. Second, the crimp sleeve 222 functions as a barrier for preventing the adhesive material 232 from wicking through the strength layer 174 and causing fiber binding adjacent the proximal end of the spring stop 212. In certain embodiments, the strength layer 174 of the cable unit 150 can be trimmed short of the proximal portion 218 of the spring stop 212, and the crimp sleeve 222 can be crimped over the proximal portion 218 and the jacket 172 without securing the strength layer 174 to the spring stop 212. In this type of arrangement, the crimp 222 sleeve functions only as an adhesive barrier.

The ruggedized connector 144 can also include a fastening member such as a threaded member 236 that mounts over the housing 224. As depicted, the threaded member 236 includes exterior threads 238 adapted to thread within a corresponding threaded port of the ruggedized adapter 134 located at the drop terminal 132. In this way, the fastening member 236 effectively anchors the housing 224 to the drop terminal 132 such that tensile load applied to the first portion 180 of the drop cable 137 is transferred through the housing 224 and the fastening member 236 to the drop terminal 132. In certain embodiments, one or more intermediate housing pieces can be provided between the housing 224 and the fastening member 236. In certain other embodiments, the ruggedized connector 144 can include one or more seals (e.g., o-ring seals) for providing an environmental seal between the connector 144 and the adapter 134 when the connector 144 is inserted within the adapter 134.

From the foregoing detailed description, it will be evident that modifications and variations can be made in the devices of the disclosure without departing from the spirit and scope of the invention.

What is claimed is:

1. A cable assembly comprising:
    a fiber optic cable including an optical fiber, a first jacket surrounding the optical fiber and a strength layer positioned between the optical fiber and the first jacket;
    an outer jacket arrangement enclosing at least a portion of the fiber optic cable, the outer jacket arrangement including a second jacket that is more robust than the first jacket, the second jacket defining a first passage in which a first strength member is positioned and a second passage in which the fiber optic cable is positioned;
    a fiber optic connector located at an end of the cable assembly, the fiber optic connector including:
        a plug body having a distal end and an opposite proximal end;
        a ferrule supporting an end portion of the optical fiber of the fiber optic cable, the ferrule being positioned at the distal end of the plug body;
        a spring positioned within the plug body for biasing the ferule in a distal direction;
        a spring stop secured to the proximal end of the plug body, the spring stop including a strength layer anchoring portion that extends proximally outwardly from the proximal end of the plug body;
        a crimp sleeve that secures an end portion of the strength layer to the strength layer anchoring portion of the spring stop, the crimp sleeve including a distal portion that extends over the strength layer anchoring portion of the spring stop and a proximal portion that extends over an end portion of the first jacket; and
        a strength member retention housing positioned adjacent the proximal end of the plug body, the strength member retention housing surrounding the crimp sleeve and including a first retention portion in which the first strength is adhesively affixed.

2. The cable assembly of claim 1, wherein the second jacket defines a third passage, wherein a second strength member is positioned within the third passage, and wherein the strength member retention housing includes a second retention portion in which the second strength member is adhesively affixed.

3. The cable assembly of claim 2, wherein the first, second and third passages of the second jacket are aligned along a single plane with the second passage positioned between the first and third passages.

4. The cable assembly of claim 1, wherein the fiber optic connector includes a threaded fastener positioned around the strength member retention housing, the threaded fastener being configured for securing the fiber optic connector to a fiber optic adapter.

5. A cable assembly comprising:
    a fiber optic cable including an optical fiber, a first jacket surrounding the optical fiber and a strength layer positioned between the optical fiber and the first jacket;
    an outer jacket arrangement enclosing at least a portion of the fiber optic cable, the outer jacket arrangement including a second jacket that is more robust than the first jacket, the second jacket defining a first passage in which a first strength member is positioned and a second passage in which the fiber optic cable is positioned;
    a fiber optic connector located at an end of the cable assembly, the fiber optic connector including:
        a plug body having a distal end and an opposite proximal end;
        a ferrule supporting an end portion of the optical fiber of the fiber optic cable, the ferrule being positioned at the distal end of the plug body;
        a spring positioned within the plug body for biasing the ferule in a distal direction;
        a spring stop secured to the proximal end of the plug body, the spring stop including a proximal portion that extends proximally outwardly from the proximal end of the plug body;
        a crimp sleeve including a distal portion that extends over the proximal portion of the spring stop and a proximal portion that extends over an end portion of the first jacket; and
    a strength member retention housing positioned adjacent the proximal end of the plug body, the strength member retention housing surrounding the crimp sleeve and including a first retention portion in which the first strength is adhesively affixed.

6. A drop cable assembly comprising:
    a fiber optic drop cable having a length that extends from a first end of the fiber optic drop cable to an opposite second end of the fiber optic drop cable;
    a first fiber optic connector mounted at the first end of the fiber optic drop cable and a second fiber optic connector mounted at the second end of the fiber optic drop cable;
    the fiber optic drop cable including a first portion that extends from the first end of the fiber optic drop cable to an intermediate location along the length of the drop cable, and a second portion that extends from the intermediate location to the second end of the fiber optic drop cable;
    the first portion of the fiber optic drop cable including:
        an optical fiber;
        a first jacket surrounding the optical fiber;
        a strength layer positioned between the first jacket and the optical fiber;

a second jacket surrounding the first jacket, the second jacket having an elongate transverse cross-sectional profile;

a first strength member positioned outside the first jacket and within the second jacket, the first strength member being capable of accommodating a tensile load of at least 150 pounds;

the second portion of fiber optic drop cable including the optical fiber, the first jacket and the strength layer, but not including the first strength member or the second jacket; and a pulling sock mounted over the second portion of the fiber optic drop cable, the pulling sock including a first end including a pulling eye and a second end attached to the second jacket of the fiber optic drop cable.

7. The drop cable assembly of claim 6, wherein the second jacket is more abrasion resistant than the first jacket.

8. The drop cable assembly of claim 6, wherein the first fiber optic connector is more robust than the second fiber optic connector.

9. The drop cable assembly of claim 6, further comprising a second strength member positioned outside the first jacket and within the second jacket, the second strength member being capable of accommodating a tensile load of at least 150 pounds.

10. A drop cable assembly comprising:
a fiber optic drop cable having a length that extends from a first end of the fiber optic drop cable to an opposite second end of the fiber optic drop cable, the fiber optic drop cable also including an intermediate location located between the first and second ends of the fiber optic drop cable;
a first fiber optic connector mounted at the first end of the fiber optic drop cable and a second fiber optic connector mounted at the second end of the fiber optic drop cable;
an optical fiber that extends continuously without splicing along the length of the fiber optic drop cable from the first fiber optic connector to the second fiber optic connector;
a first jacket surrounding the optical fiber, the first jacket extending along the length of the fiber optic drop cable from the first fiber optic connector to the second fiber optic connector;
a strength layer positioned between the first jacket and the optical fiber, the strength layer extending along the length of the fiber optic drop cable from the first fiber optic connector to the second fiber optic connector;
a second jacket surrounding the first jacket, the second jacket extending along the length of the fiber optic drop cable from the first fiber optic connector to the intermediate location, the second jacket having an elongate transverse cross-sectional profile, the second jacket terminating at the intermediate location;
a first strength member positioned outside the first jacket and within the second jacket, the first strength member extending along the length of the fiber optic drop cable from the first fiber optic connector to the intermediate location, the first strength member terminating at the intermediate location, the first strength member being capable of accommodating a tensile load of at least 150 pounds; and
a pulling sock mounted over the second end of the fiber optic drop cable, the pulling sock extending along the length of the fiber optic drop cable from the second end of the fiber optic drop cable to the intermediate location of the fiber optic drop cable, the pulling sock including a first end including a pulling eye and a second end attached to the second jacket of the fiber optic drop cable.

11. The drop cable assembly of claim 10, wherein the second jacket is more abrasion resistant than the first jacket.

12. The drop cable assembly of claim 10, wherein the first fiber optic connector is more robust than the second fiber optic connector.

13. The drop cable assembly of claim 10, further comprising a second strength member positioned outside the first jacket and within the second jacket, the second strength member being capable of accommodating a tensile load of at least 150 pounds.

14. A drop cable assembly comprising:
a fiber optic drop cable having a length that extends from a first end of the fiber optic drop cable to an opposite second end of the fiber optic drop cable, the fiber optic drop cable also including an intermediate location located between the first and second ends of the fiber optic drop cable;
a first fiber optic connector mounted at the first end of the fiber optic drop cable and a second fiber optic connector mounted at the second end of the fiber optic drop cable;
an optical fiber that extends continuously without splicing along the length of the fiber optic drop cable from the first fiber optic connector to the second fiber optic connector;
the fiber optic drop cable having a first cable segment that extends from the first end of the fiber optic drop cable to the intermediate location and a second cable segment that extends from the intermediate location to the second end of the fiber optic drop cable, the first cable segment being more robust than the second cable segment and the second cable segment being more flexible than the first cable segment;
the fiber optic drop cable including a cable unit that extends from the first end of the drop cable to the second end of the drop cable, the cable unit including the optical fiber, a first jacket surrounding the optical fiber and a strength layer positioned between the optical fiber and the first jacket, the fiber optic drop cable also including an outer jacket and reinforcing arrangement that extends from the first end of the drop cable to the intermediate location, the outer jacket and reinforcing arrangement defining an elongate transverse cross-sectional profile and being able to accommodate a tensile load of at least 300 pounds; and
a pulling sock mounted over the second end of the fiber optic drop cable, the pulling sock extending along the fiber optic drop cable from the second end of the fiber optic drop cable to the intermediate location of the fiber optic drop cable, the pulling sock including a first end including a pulling eye and a second end attached to the first cable segment of the fiber optic drop cable.

15. The drop cable assembly of claim 14, wherein the first jacket includes a polymeric base material and a liquid crystal polymer within the polymeric base material.

* * * * *